Patented Sept. 23, 1952

2,611,728

UNITED STATES PATENT OFFICE 2,611,728

INSECTICIDAL COMPOSITIONS CONTAINING SUBSTITUTED ALIPHATIC ESTERS OF DIETHYL DITHIOPHOSPHORIC ACID

Jeffrey H. Bartlett, Westfield, Harry W. Rudel, Roselle Park, and Elmer B. Cyphers, Cranford, N. J., assignors to Standard Oil Development Company, a corporation of Delaware No Drawing. Application November 1, 1949, Serial No. 124,952

4 Claims. (Cl. 167—22)

This invention relates to new and useful improvements in parasiticidal preparations and more particularly to improved fungicides and insecticides. This invention also relates to methods of protecting organic material subject to attack by low orders of organisms. More specifically, this invention is concerned with parasiticidal compositions containing as the active ingredient a substituted aliphatic ester of diethyl dithiophosphoric acid.

It has now been found that substituted aliphatic esters of diethyl dithiophosphoric acid are extremely effective for checking the growth of insects and fungi. These compounds may thus be used as novel ingredients of parasiticidal compositions.

Suitable compounds of the indicated type are thus illustrated by Formula I below

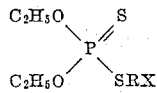

wherein R is an alkylene group and X is a radical selected from the group consisting of CN and Cl.

Those compounds wherein the R contains from 2–6 carbon atoms are especially effective. Thus the following esters of diethyl dithiophosphoric acid exhibit marked parasiticidal activity: chloroethyl, chloropropyl, chlorobutyl, chlorohexyl, etc., cyanoethyl, cyanopropyl, cyanobutyl, etc.

Particularly effective and desirable compounds of the present class of compounds are the cyanoethyl and chloroethyl esters of diethyl dithiophosphoric acid.

It is especially surprising to find that the $C_2$–$C_6$ aliphatic esters possess extremely good activity in view of the fact that aliphatic esters containing a larger number of ester carbon atoms shown distinctly less activity. Thus, the wax ester of diethyl dithiophosphoric acid shows distinctly inferior insecticidal activity as compared to the aliphatic esters tested which contained the indicated lesser number of R ester carbon atoms.

The active substituted aliphatic ester compounds of this invention may be prepared in general by addition or condensation reactions of the indicated substituted aliphatic hydrocarbons with diethyl dithiophosphoric acid. The latter, in turn, can be prepared by reacting ethyl alcohol or mercaptan with sulfides of phosphorus. The active compounds of this invention can also be prepared by the process of U. S. Patent 2,266,514, issued December 16, 1941, of reacting a salt of the dithio acids, such as the alkali metal or ammonium salt, with a halide of the radical which is to be introduced.

The following examples are given to illustrate this invention and include both the preparation of substituted aliphatic esters of diethyl dithiophosphoric acid, and test results obtained on the active compounds used as parasiticides.

*Example 1.—Preparation of chloroethyl ester of diethyl dithiophosphoric acid*

1 mol of ammonium diethyl dithiophosphate was reacted with 1 mol of ethylene dichloride by refluxing an acetone solution. Ammonium chloride and unreacted ethylene chloride and alcohol were removed by filtration and vacuum distillation, and the residue washed with water and dried, producing beta chloroethyl diethyl dithiophosphate:

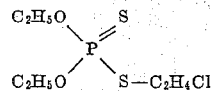

*Example 2.—Preparation of the cyano ethyl ester of diethyl dithiophosphoric acid*

An Erlenmeyer flask was charged with 93·g. of vacuum distilled diethyl dithiophosphoric acid and 30 g. of distilled acrylonitrile. Within a few minutes the temperature started to rise and soon reached 40° C. where it was maintained by cooling with cold water. After the heat of reaction had subsided the mixture was allowed to stand at room temperature over night (22 hours). It was then heated for 3 hours on a steam bath after which it was transferred to an evaporating dish and blown with nitrogen for 3 hours on the steam bath. The resulting product had a neutralization number of 8.8, contained 27.03% sulfur and 5.31% nitrogen.

*Example 3*

The compounds prepared in Examples 1 and 2 were tested for parasiticidal activity. The values given in column I of the following table, represent the percentage mortality of the test insects after 96 hours following a two-minute immersion in an 0.25% aqueous solution or suspension of the test compound.

The results in column II are given as per cent mortality of the test insect after 96 hours following blood-stream injection of 0.002 cc. of a 5% solution of the test compound.

The figures in column III list the results obtained on the Nelson drop test for house-fly toxicity. At full dosage, 5 mg. of test material/gm. body weight is placed on the fly's body (0.002 cc. of a 5% solution per fly). Standards: 0.01 mg. DDT/gm. gives 65% kill (0.002 cc. of a 0.01% solution per fly). 0.038 mg. pyrethrin/gm.

gives 40% kill (0.002 cc. of an 0.038% solution per fly).

Not all tests were performed on each compound. The blank spaces indicate that that particular test was not performed.

| Compound | Column I, Contact Insecticidal Activity, Percent Kill | | Column II, Bloodstream Insect Activity, Percent Kill *Periplanitus Americana* (American Roach) | | Column III, House-Fly Toxicity Nelson Drop Test |
|---|---|---|---|---|---|
| | *Blattella Germanica* (German Roach) A | *Omelpeltus Sociatus* (Milk Weed Bug) B | Female A | Male B | |
| Chloroethyl ester of diethyl dithiophosphoric acid | 100 | 100 | 100, D/5-100 | 100, D/5-100 | D/5 –100<br>D/100-100<br>D/200- 90<br>D/500- 15 |
| Cyanoethyl ester of diethyl dithiophosphoric acid | 100 | 100 | 100, D/5-100 | 100, D/5-100 | D/5 –100<br>D/200-100<br>D/500- 55 |
| Wax ester of diethyl dithiophosphoric acid | 30 | 5 | 20 | 40 | |
| DDT | 100 | 100 | 100 | 100 | D/500- 65 |
| Pyrethrin | | | | | D/132- 40 |

These figures indicate that the substituted aliphatic compounds of our invention are especially and surprisingly effective contact and ingestion insecticides. The wax ester, containing a larger number of carbon atoms than the preferred ester range of this invention on the other hand, exhibited a contact insecticide activity only one-twentieth as great as the compounds tested. It is to be noted particularly that the compounds of this invention were about as good as DDT on the Nelson drop test and superior to pyrethrin on this test.

The compounds of this invention which in most cases are liquids, are best distributed in the form of sprays such as in aqueous dispersions or dust compositions of the active ingredient with a powdered clay.

Since the compounds of this invention are insoluble in water, it is preferable to use them admixed with wetting agents so as to be able to secure aqueous emulsions and consequent uniformity of dispersion in the resulting colloidal system. The use of these wetting agents also increases the spreading action of the spray by decreasing its surface tension. This results in the securing of better contact of the spray with the surface being treated, and consequently brings the active ingredient into intimate contact with the parasite life. The concentration of active ingredient in the aqueous emulsions varies with the insect pests to be treated. In general, the aqueous emulsion contains about 5% active ingredient, and about 1% wetting agent by weight. Thus, a typical emulsion concentrate formulation consists of 83% chloroethyl ester of diethyl dithiophosphoric acid, and 17% petroleum sulfonate of about $C_{10}$–$C_{20}$ length by weight. This mixture can then be diluted with about 94 parts of water to 6 parts of concentrate.

The active compounds of this invention may also desirably be made up in solid compositions. A dust composition containing about 5% active ingredient is made up by admixing the active compounds with clays such as fuller's earth, china clay, kaolin, or bentonite. Solid wettable powders for aqueous dispersion contain about 75% active ingredient, 24% clay, and about 1% wetting agent. Clay itself also acts as a spreading agent.

The term "dispersing agent" is consequently used hereafter to connote generically, the various "wetting agents" and "spreading agents" including clays that are adapted to be admixed with the active compounds of this invention in order to secure better wetting and spreading of the sprays of the active ingredients in liquid vehicles in which they are insoluble. (See Frear—"Chemistry of Insecticides, Fungicides, and Herbicides," second edition, page 280).

Among the water soluble wetting agents that can be used are the sulfates of long chain alcohols such as dodecanol up to octadecanol, sulfonated amide and ester derivatives, sulfonated aromatic and mixed alkyl-aryl sulfonate derivatives, esters of fatty acids such as the ricinoleic acid ester of sorbitol, and petroleum sulfonates of $C_{10}$ to $C_{20}$ length. The non-ionic emulsifying agents such as the ethylene oxide condensation products of alkylated phenols may also be used.

Solvents for the compounds of this invention may be utilized as auxiliary agents if desired. Among the solvents for the compounds of this invention are petroleum fractions, aromatic hydrocarbons such as benzene or toluene, alcohols, ketones such as acetone or methyl ethyl ketone, esters, halogenated hydrocarbons, etc.

The compounds of this invention may also be admixed with carriers that are themselves active, such as other parasiticides, hormones, herbicides, fertilizers, anad wetting agents. Stomach and contact insecticides such as the arsenates, fluorides, rotenone, and the various fish poisons and organic insecticides, such as di(p-)chlorophenyl - trichloroethane, benzene - hexachloride, and similar products may also be advantageously added.

It is to be understood that the invention is not limited to the specific examples which have been offered merely as illustrations, since other derivatives can be prepared, and that modifications may be made without departing from the spirit of the invention.

What is claimed is:

1. An insecticidal dust composition comprising a substituted aliphatic ester of diethyl dithiophosphoric acid selected from the group consisting of the cyanoethyl and chloroethyl esters admixed with a powdered clay.

2. An insecticidal dust composition comprising the chloroethyl ester of diethyl dithiophosphoric acid admixed with a powdered clay.

3. An insecticidal dust composition comprising the cyanoethyl ester of diethyl dithiophosphoric acid admixed with powdered clay.

4. An insecticidal dust composition as in claim 3 in which the clay is benotonite.

JEFFREY H. BARTLETT.
HARRY W. RUDEL.
ELMER B. CYPHERS.

REFERENCES CITED

The following references are of record in the file of this patent:

UNITED STATES PATENTS

| Number | Name | Date |
|---|---|---|
| 1,939,951 | Buchanan | Dec. 19, 1933 |
| 2,063,629 | Salzburg | Dec. 8, 1936 |
| 2,143,639 | Caprio | Jan. 10, 1939 |
| 2,269,396 | Jayne | Jan. 6, 1942 |
| 2,485,573 | Craig | Oct. 25, 1949 |
| 2,536,647 | Kosolapoff | Jan. 2, 1951 |

OTHER REFERENCES

Ludvik et al., "Toxicity of Certain Esters of Phosphorus Acids to Aphids," J. Econ. Ent., volume 40, number 1, February 1947, pages 97 to 100.

Schrader, Development of New Insecticides, B.. I. O. S. Trip No. 1103; pages 1, 2 and 33 to 35 at hand, and considered pertinent. (Publication date April 23, 1948, Bibliography of Science and Ind. Reports, volume 9, number 4, page 284.)